J. A. MONTGOMERY, DEC'D.
H. I., W. H. & M. O. MONTGOMERY, ADMINISTRATORS.
COW STABLE.
APPLICATION FILED JUNE 28, 1910.
1,033,441.
Patented July 23, 1912.
4 SHEETS—SHEET 1.
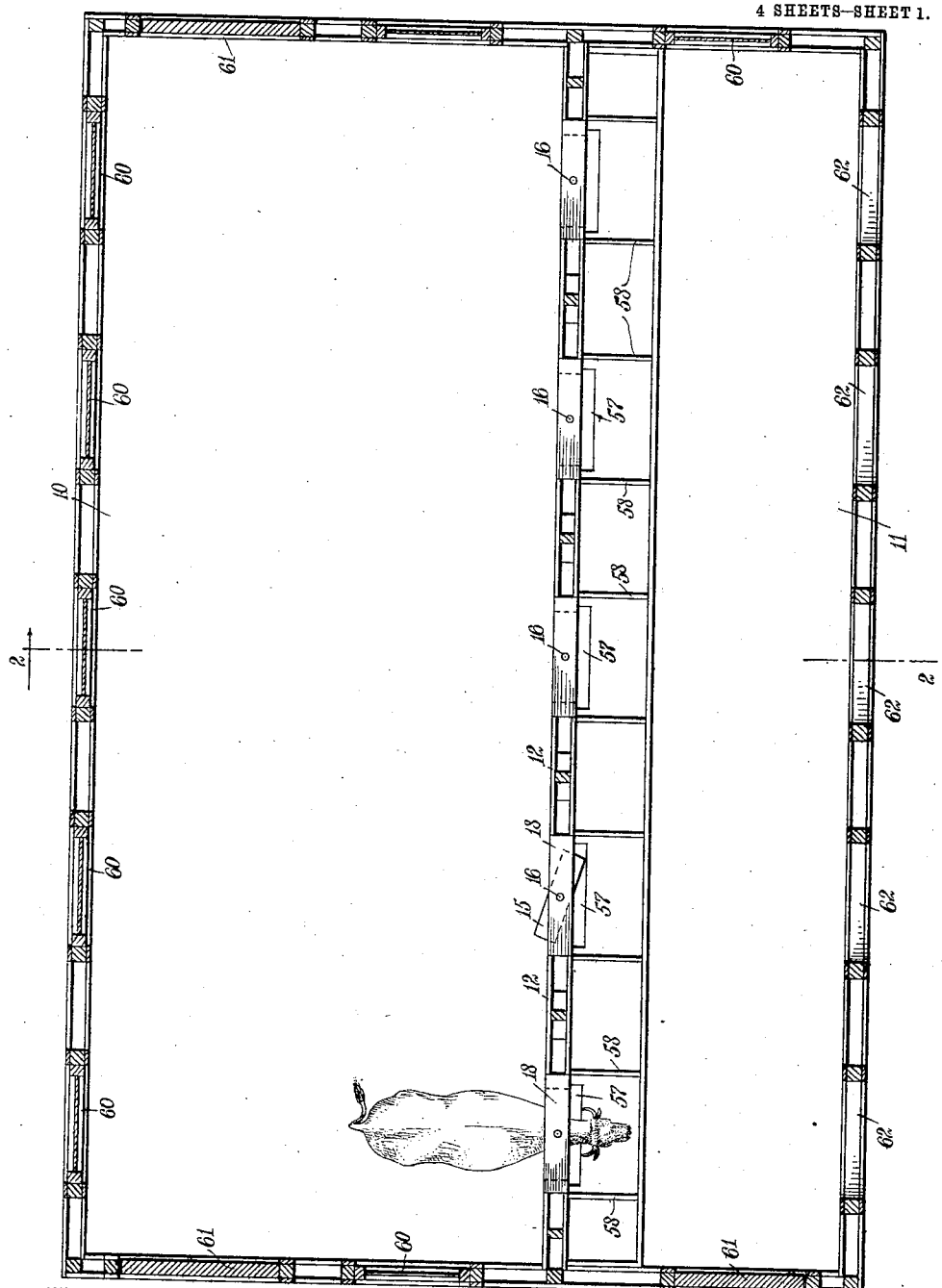

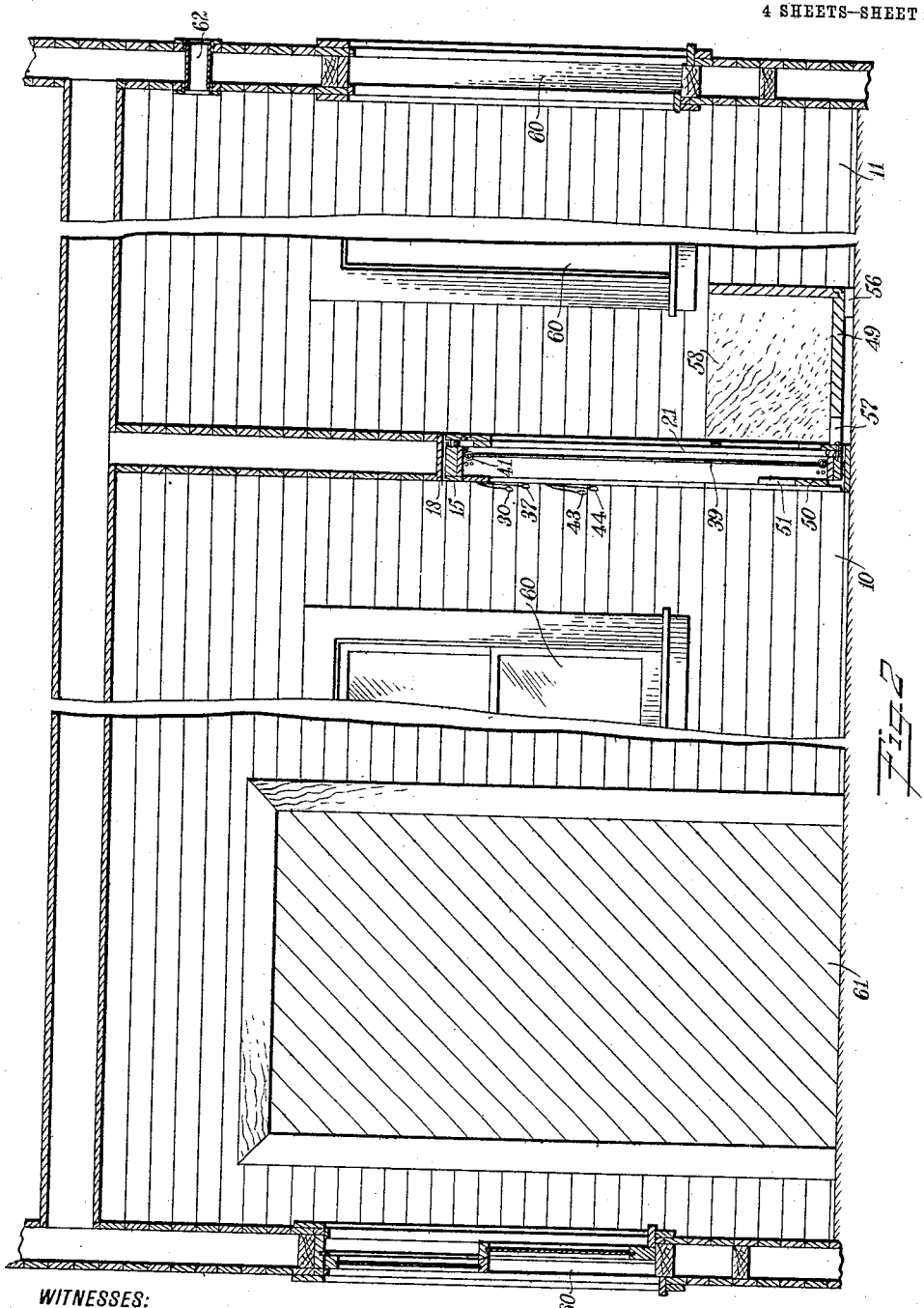

J. A. MONTGOMERY, DEC'D.
H. I., W. H. & M. C. MONTGOMERY, ADMINISTRATORS.
COW STABLE.
APPLICATION FILED JUNE 28, 1910.
1,033,441.
Patented July 23, 1912.
4 SHEETS—SHEET 3.
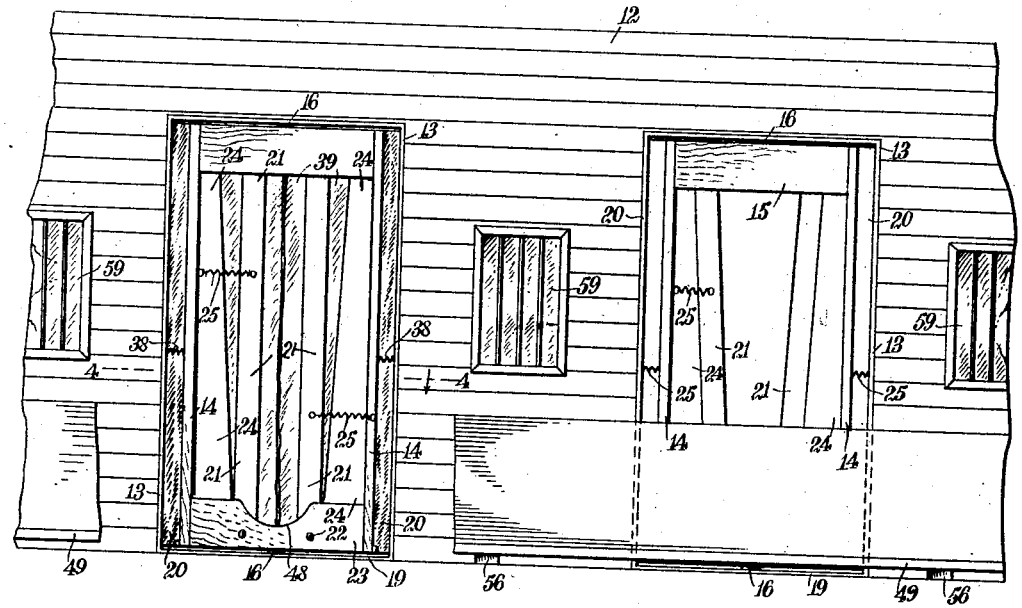
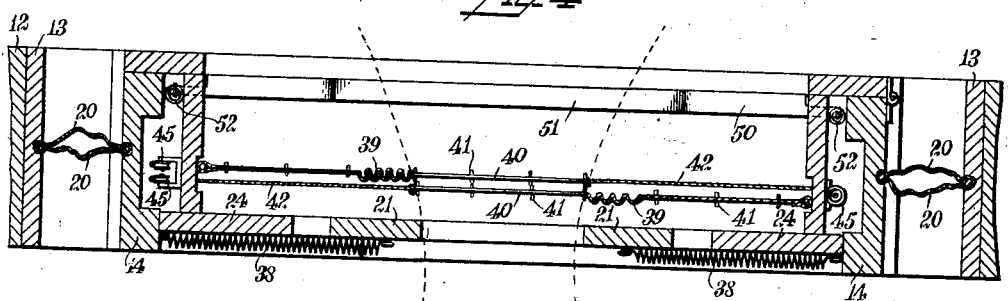
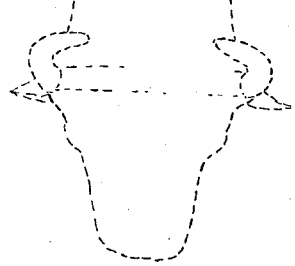
WITNESSES:
E. G. Bromley,
INVENTOR
John A. Montgomery
BY
ATTORNEYS J. A. MONTGOMERY, DEC'D.
H. I., W. H. & M. C. MONTGOMERY, ADMINISTRATORS.
COW STABLE.
APPLICATION FILED JUNE 28, 1910.
1,033,441.
Patented July 23, 1912.
4 SHEETS—SHEET 4.
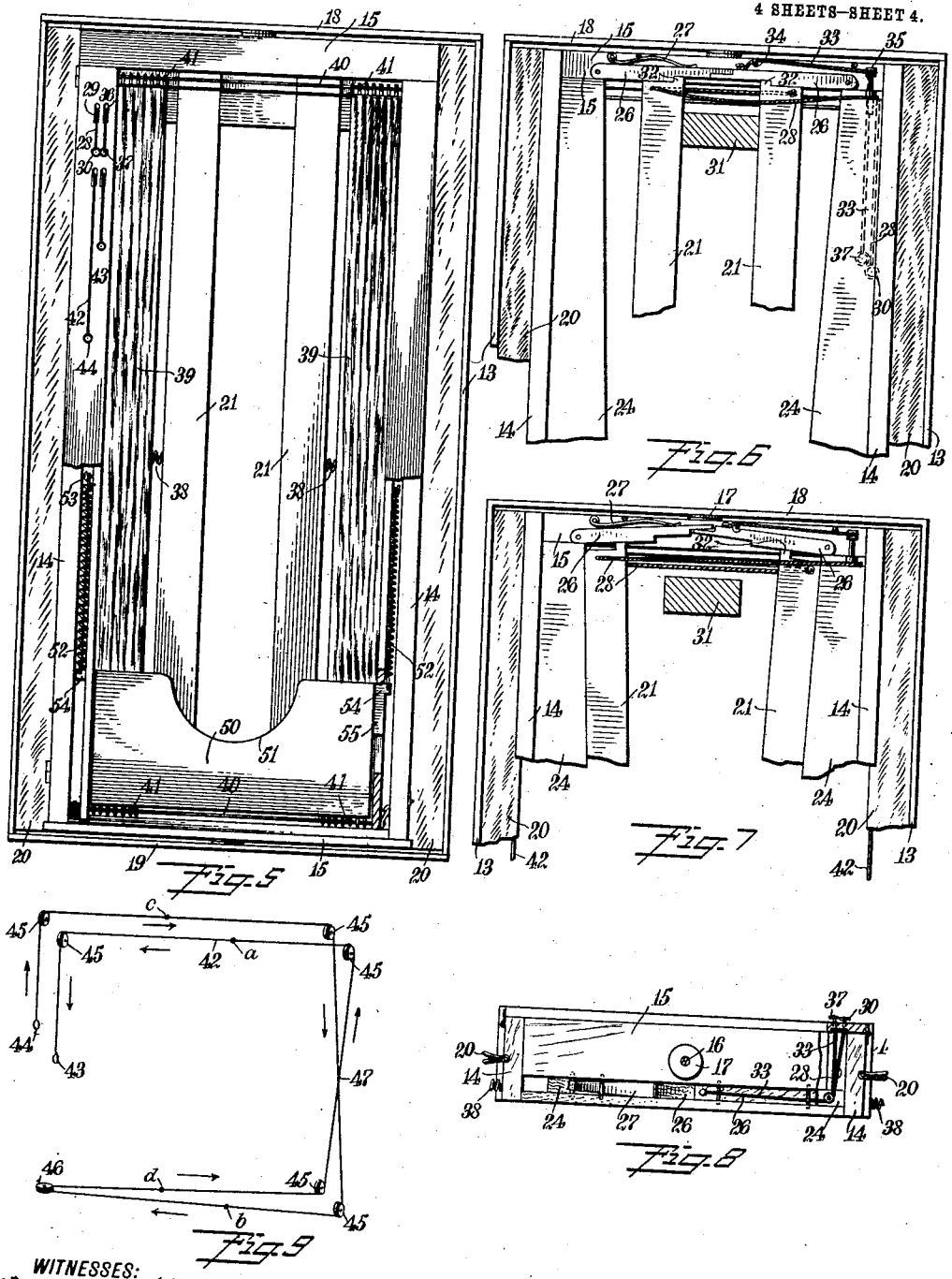
WITNESSES:
E. G. Bromley
C. H. Murdock
INVENTOR
John A. Montgomery
BY Munn & Co.
ATTORNEYS

UNITED STATES PATENT OFFICE.

JOHN ARTHUR MONTGOMERY, OF WALTON, NEW YORK; HARRIET I. MONTGOMERY, WILLIAM H. MONTGOMERY, AND MAXWELL C. MONTGOMERY ADMINISTRATORS OF SAID JOHN ARTHUR MONTGOMERY, DECEASED.

COW-STABLE.

1,033,441. Specification of Letters Patent. Patented July 23, 1912.

Application filed June 28, 1910. Serial No. 569,298.

*To all whom it may concern:*

Be it known that I, JOHN A. MONTGOMERY, a citizen of the United States, and a resident of Walton, in the county of Delaware and State of New York, have invented a new and Improved Cow-Stable, of which the following is a full, clear, and exact description.

Among the principal objects which the present invention has in view are: to provide a stable constructed and arranged so that the atmosphere infolding the head and breathed by the cows is maintained separated from the atmosphere infolding the body of the cows; to provide a flexible neck confining partition adapted to assume, or be placed in position to permit the assumption by the animal of various attitudes standing or recumbent; to provide a construction for a feeding manger adapted to be made and maintained sanitary; to provide means for inspecting the one section of the stable from the other section thereof; and to provide suitable ventilation augmenting devices for the head confining section of the stable.

One embodiment of the present invention is disclosed in the structure illustrated in the accompanying drawings, in which like characters of reference denote corresponding parts in all the views, and in which—

Figure 1 is a horizontal section in plan of a stable constructed and arranged in accordance with the present invention; Fig. 2 is a vertical section taken on the line 2—2 in Fig. 1; Fig. 3 is a fragmentary view, on an enlarged scale and in elevation, showing the swinging retaining screen for confining a cow in the stable; Fig. 4 is a detail view, on an enlarged scale and in horizontal section, taken on the line 4—4 in Fig. 3; Fig. 5 is a detail view, on an enlarged scale, showing in side elevation the retaining screen, part of the outer structure being cut away to show the inner working members; Fig. 6 is a detail view, fragmentary in form, showing the confining yoke stanchions in locked position; Fig. 7 is a view similar to Fig. 6, showing the stanchions in unlocked position; Fig. 8 is a detail view in plan, showing the top frame and pivot for the retaining screen; Fig. 9 is a detail view in layout of the cable for operating the adjustable curtains.

The present custom is to stable cows in compartments where they breathe the atmosphere more or less polluted with the fumes from the body or contaminated by the excretions of the various animals. It is well known that the unventilated moisture laden atmosphere of the usual stable for cows is productive of tuberculosis and other bacilli diseases to which the cow is at present subjected. It is needful that the body of the cow should be well protected and warmed, and also that the air breathed should be pure. The most feasible method of warming the body has heretofore proved to be the suppression of ventilation and to confining the accumulation of bodily heat radiated from the bodies of the various animals confined. Cows do not seem to thrive when covered with blankets, even if this method were, for other reasons, not deemed impracticable. Further, it has been discovered that when cows are so housed as to breathe pure air, the milk yielded by the cows will be purer.

It is an endeavor on my part to overcome the difficulties mentioned by providing a stable having two distinct and air-separated compartments 10 and 11, within the former of which it is arranged that the body portion in the rear of the neck of the animal shall be confined, while the neck adjacent to the head, and the head, shall be confined within the compartment 11. By an arrangement permitting this disposition of the animal I am permitted to provide distinct systems of ventilation, that in the compartment 11 being augmented far in excess of that in the compartment 10.

Lengthwise of the building I erect a partition 12, extended from the floor to the ceiling or roof of the stable. The partition is closely formed to separate the compartments 10 and 11. At intervals openings formed by frames 13, 13 are provided in the partition 12 to receive a yielding neck confining screen. These openings are separated the desired distance to permit the freedom necessary for the bodies of the cows when the necks and heads are confined in the screens mounted in the said openings.

The screens consist of a rectangular rigid frame, the side stiles 14, 14 whereof are joined at the upper and lower ends by rails 15, 15. The rails 15, 15 are provided at the balancing center with pivot pins 16 set out from blocks 17. The blocks 17 are properly seated on similar blocks formed in the heads 18 and sills 19 of the frame openings. The frame of the screen is thus permitted to rock in the vertical plane on the said pivots. The limit of this rocking is set by flexible curtains 20, 20, secured to the said stiles 14 and the vertical members of the frames 13. The curtains 20, 20 thus cover the gap which would otherwise be left between the screen frame and the opening frame 13.

The screen is provided to form retaining members for the cow as a substitute for the halter provided in the usual stables. The retaining devices so employed are stanchion bars 21, 21. The stanchion bars 21, 21 are pivoted at 22, 22 in a sill plate 23, secured rigidly in structural relation with the stiles 14, 14. Between the stanchion bars 21, 21, when in the spread condition, and the stiles 14, 14, are panels 24, 24. The stanchion bars 21, 21 are retracted to rest upon the panels 24, 24, and to spread the upper ends of the said stanchions by spiral springs 25, 25. The said stanchion bars 21, 21 are locked in vertical parallel disposition by latches 26, 26, which latches are seated by a spring 27. The ends of the latches 26 are overlapped, and the spring 27 bears on the upper of said latches, one depressing the other of said latches through the connection between the same.

The stanchion bars 21, 21 are drawn together when the head of the cow is protruded therethrough. The stanchion bars are thus moved by a cable 28. The cable 28 is anchored in one of the said stanchion bars and reeved through an eyelet or perforation in the other of said stanchion bars, and guided over a pulley 29 to convey the said cable in depended position on the said screen and on the body containing compartment of the stable. The cable 28 is provided with a pull ring 30 by which the said cable is operated. In the operation of the cable, when the same is drawn upon, the stanchion bars are drawn together until they strike upon a spacing block 31. In this position the latches 26, 26 strike behind the extended ends 32, 32 provided on said stanchion bars and lock the same in vertical or holding position.

When it is desired to release the animal a cable 33 is drawn upon. The cable 33 is attached to the lower of the said latches 26, 26, and is guided over a pin 34 and pulleys 35 and 36 to the outer side of the frame, where it is provided with a ring 37. When the cable 33 is drawn upon it raises the latches 26, 26 until the same are lifted from engagement with the ends 32, 32 on the stanchion bars 21, 21. Immediately the latches 26, 26 release the said stanchions the springs 25, 25 operate to retract the same in inclined position, as illustrated at the right of Fig. 3 of the drawings.

The screen frame is maintained in a normal position parallel to the partition 12 by spiral springs 38, 38, which springs are extended between the stiles 14, 14 and the vertical members of the frames 13.

Secured closely to the stiles 14, 14 are curtains 39, 39. The curtains 39, 39 are each guidably supported on runner rods 40, 40 by eyelet rings 41, 41, similar to the manner of hanging domestic curtains. The curtains are operated by a cable 42, the ring terminals 43 and 44 whereof are disposed in such manner that operating the said cable by pulling on one opens the said curtains, while operating the cable by pulling on the other closes the said curtains. This operation of the cable 42 is effected through the method of supporting the same on the pulleys 45, 45 and 46. The pulley 46 constitutes the turning pulley for the different extensions of the cable 42. Between the upper and lower pairs of pulleys 45, and at 47, the cable 42 is crossed. By connecting the opposite extensions of the cable 42 at the upper and lower edges of the curtains 39, the same drawing direction is imparted to each edge of the said curtains when one of the terminals of the cable is drawn upon. Thus, as shown in Fig. 9 of the drawings, when the ring 43 is drawn upon, the cable 42 moved in the manner indicated by the arrows. If the right hand curtain be secured at the point $a$ on the upper extension of the cable, and at the point $b$ on the lower extension of the cable, the curtain will operate in the same direction. The left hand curtain is secured at the point marked $c$ in the drawings on the opposite extension of the cable at the upper edge, and at the point $d$ on the lower edge of the curtain, and on the opposite extension of the cable 42.

When the curtains 39, 39 above described are drawn by pulling on the ring 43, the edges of the curtains are drawn close against the side of the neck of the animal whose head is extended between the stanchion bars 21, 21. The gap in the curtains is not sufficient to permit any quantity of atmosphere to pass from the inner compartment 10 of the stable to the outer compartment 11. At the same time the gap does not confine the neck of the animal against up and down movement, the curtains spreading to permit the movement of the neck.

It will be seen from the above described construction that an animal confined between the stanchion bars 21, 21 is at liberty to move his head and neck within reasonable latitudes compatible with the object of the frame and stanchion bars, which is to hold the animal in substantially restricted area. The stanchion bars 21, 21 open to near the floor, the plate 23 being scooped out to form a recess 48, the upper edge of which is very close to the bottom board 49 of the manger. This construction permits the animal to assume a recumbent or reposeful position without restriction. In the recumbent position it will be understood that the head of the animal rests on the board 49 of the manger.

It is to prevent the pawing of the animal, and striking with the hoof upon the curtains 39, 39, or the insertion of the hoof between the stanchion bars 21, 21, that I have provided a fender board 50. The fender board 50 is cut away in the center to form a recess 51, adapted to fit under and around the neck of the animal when confined between the stanchion bars 21, 21. The board 50 is normally raised by spiral springs 52, 52, which springs are anchored at 53, 53 to the frame of the screen and to lugs 54, 54 extended from the board 50. The board 50 is further provided with guide extensions 55, which are fitted in grooves provided in the frame of the screen to guide the movement of the said board when the same is depressed to permit the neck of the animal to assume the lowered recumbent position when in repose.

The manger is constructed from the bottom board 49. This is raised on a sill block 56 a few inches above the floor of the stable. A drain slot 57 is provided for cleaning the manger. In the present instance, however, this is provided for by moving the manger and cleaning thereunder. The manger is extended the full length of the compartment 11, and each trough is divided by partitions 58, 58.

For the inspection from the compartment 11 of the compartment 10, the partition 12 is provided with small windows 59, 59. It will be understood that the compartments 10 and 11 are each provided with lighting windows 60, 60, and with entrance doors 61, 61.

To augment the ventilation of the compartment 11, the said compartment is provided with a series of ventilating openings 62, 62. It will be understood in this connection that any approved method of ventilating the compartment 11 to secure a perfect circulation of air therein may be employed in this construction, without altering the spirit of the present invention.

Having thus described my invention, what I claim as new and desire to secure by Letters Patent is:—

1. In a cow stable, a partition forming a plurality of compartments, said partition adapted to prevent circulation of air between said compartments; a plurality of openings in said partition for the protrusion of the heads of the animals; a plurality of stanchions vertically disposed within said openings adapted to prevent the withdrawal of the heads of the said animals; yielding curtains secured in said openings adapted to infold the necks of the animals; a plurality of guide rods for said curtains to guidingly support the same in parallel paths; and a cable attached to said curtains for drawing the same upon the necks of the animals.

2. In a cow stable, a partition forming a plurality of compartments, said partition adapted to prevent the circulation of air between said compartments; a plurality of openings in said partition for the protrusion of the heads of the animals; a plurality of stanchions vertically disposed within said openings adapted to prevent the withdrawal of the heads of the said animals; yielding curtains secured in said openings adapted to infold the necks of the animals; a plurality of guide rods for said curtains to guidingly support the same in parallel paths; and a cable crossed in its extension and attached to said curtains to draw the same past each other to fold upon the necks of the animals.

In testimony whereof I have signed this specification in the presence of two subscribing witnesses.

JOHN ARTHUR MONTGOMERY.

Witnesses:
WILLIAM FINCH WHITE,
SAMUEL HENRY FANCHER.

---

Copies of this patent may be obtained for five cents each, by addressing the "Commissioner of Patents, Washington, D. C."